Dec. 23, 1952     J. O. MUNDELL     2,622,381
UNIVERSAL HALTER

Filed March 10, 1952

Inventor
John O. Mundell
by Talbert Dick & Adler
Attorneys

Witness
Edward P. Seeley

Patented Dec. 23, 1952

2,622,381

UNITED STATES PATENT OFFICE 2,622,381

UNIVERSAL HALTER

John O. Mundell, Des Moines, Iowa

Application March 10, 1952, Serial No. 275,771

5 Claims. (Cl. 54—24)

My invention is an improved halter of a construction and with adjustments thereon that make it adaptable for use with substantially any domesticated animal on which a halter is used.

The use of halters for domesticated animals is reported in the earliest recorded history. These early halters were of a most rudimentary nature as one would expect. Through the centuries man has improved on the halter until the present time, and it now is a rather refined piece of stable "tack." Halters are even provided with some adjustments but generally they are designed to fit a particular size of domesticated animal. In the horse category, for example, there are the horse size, the cobb size, the colt size, the pony size and the suckling or weanling size. A well equipped stable maintains all these different sizes. A considerable burden on "tack" is imposed on the horse breeder, therefore, who is apt to have at least one of most of these sizes of animals on his premises at most times. The burden imposed on the stable is not so great as the problem encountered by the general farmer, however, who may have different kinds as well as different sizes of one kind of animal.

A general farmer who still has the need for horses and also raises cattle finds that his halter needs are even more varied than those of the horseman who is raising no cattle. The bovine head is broader and shorter than the equine head which causes the halter shape to be different. Also of course the calf requires a different size halter than the adult cow or bull. Consequently the farmer must provide himself with a considerable variety of cow and calf as well as various size horse halters if he has a variety of these different categories of animals.

In actual practice many stock breeders have halters custom made for particular animals. The chance of having a prize young steer or the like free himself from his halter and stray to become lost or injured is a great risk. Most breeders cannot afford to take such a chance. Since standard halters are not apt to fit with the desired precision, the custom halter is widely used. A single custom halter for an animal is not expensive; but as prize winning animals grow, several of such halters may be needed. The cost of providing these various halters is great which tends to cause procrastination in providing the next larger size each time the animal grows some. Also the new halter tends to be ordered a little large so that it will last longer. The troubles that can flow from ill fitting halters are considerable and to be avoided if at all possible.

The failure to provide a halter of the correct size may result in chafing and injury to the animal in much the same manner that a pair of ill fitting shoes cause foot troubles for a human. Even worse, however, is the danger that the animal can escape from an oversize halter that is being used in a make-shift manner, because a halter designed for the particular animal is not available. Sometimes a halter of rope is fashioned, but such always at least appear to be an uncomfortable arrangement and also are hard to construct as to fit well. Usually such halters must be classed as make-shift. They also tend to be uneconomical of time as they are harder to mount on the animal than a leather halter provided with the usual buckles. It is obviously much easier to buckle a leather halter about the animal's head than to secure a rope halter thereabout. Some halters may be slipped on without buckling or the like fastening. Such a halter is satisfactory for a docile well trained animal. It is not satisfactory for a mule or other traditionally stubborn animal, however, where resistance to a forward pull is encountered. I have overcome the shortcomings of the prior art by inventing a single halter that will serve for practically all kinds and sizes of domesticated animals for which a halter is used.

In view of the foregoing it is the principal object of my invention to provide a universal halter.

It is a further object of my invention to provide a halter that can be made larger as the animal for which it is being used grows.

It is a further object of my invention to provide a halter that can be adjusted for different shaped animal heads.

It is a still further object of my invention to provide a halter that obviates the need for custom built halters.

It is a further object of my invention to provide a halter that is economical to manufacture and refined in appearance.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Figure 1:
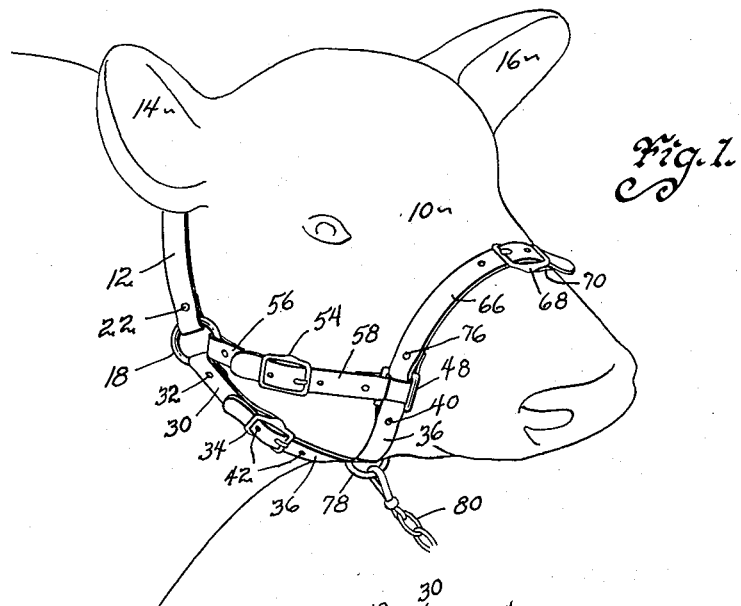
Fig. 1 is a perspective view of my halter on a cow's head. A fragment of a lead chain is shown.
Figure 2:
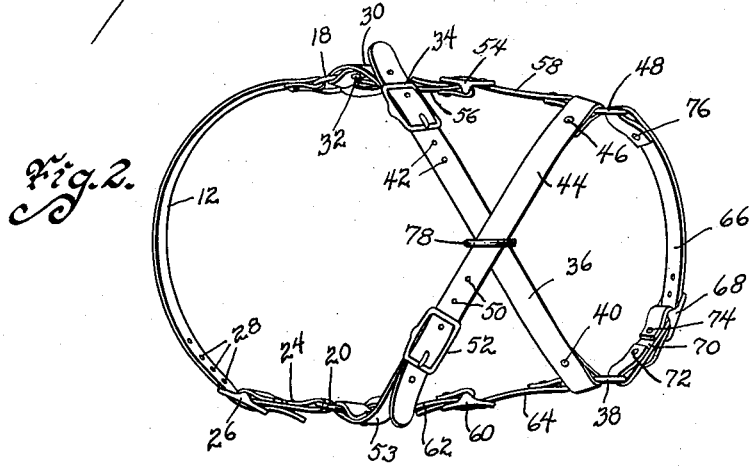
Fig. 2 is a bottom view of my halter.
Figure 3:
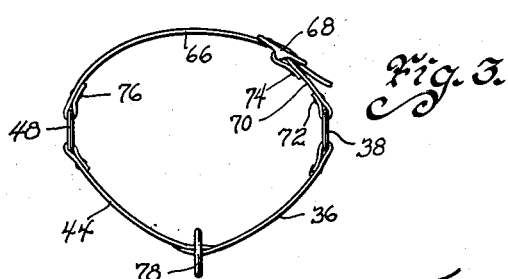
Fig. 3 is a front view of my halter.

Referring to the drawings, the numeral 10 designates the cow's head which is used for sake of illustration. A head strap 12 extends across the back of the head and behind the ears 14 and 16. The ends of this strap are secured to the rings designated 18 and 20 respectively. One end of this strap is non-adjustably secured to ring 18 as by the rivet 22. It could be sewed equally well, and I have shown a rivet as merely illustrative of a fixed connection. The other end of the strap 12 is secured in an adjustable manner as by the short strap 24 secured to the ring by a rivet or stitching and similarly secured to the buckle 26 in a similar manner. The other end of strap 12 is provided with the usual series of holes 28 for proper adjustment of the strap end with the buckle 26.

A right hand buckle strap 30 is also secured to the ring 18 as by the rivet 32 or the like and the right hand chin strap buckle 34 by another rivet or stitching which is not shown. The right hand chin strap 36, which is so called because it is secured to the right hand buckle, has its secured end attached to the left square 38, "square" being a term in the art used to refer to a ring that is made in a square shape. The strap is loop secured and held by a rivet 40 after the common manner of securing such straps. The strap has holes 42 in the free end. A left hand chin strap 44 is secured by rivet 46 to right square 48. The holes 50 in the strap end selectively are engaged by buckle 52 which is riveted or the like to strap 53. The strap 53 is connected to ring 20. The right hand cheek buckle 54 is secured to ring 18 by strap 56. The buckle adjustably engages the right hand cheek strap 58 to provide longitudinal adjustment of the right side. A left hand cheek buckle, buckle strap, and strap designated 60, 62 and 64 respectively provide a similar adjustment for the left side. Squares 38 and 48 are also connected by the nose strap 66 engaging nose buckle 68. The latter is secured to square 38 by strap 70 secured by the rivets 72 and 74 to the square and buckle respectively. The rivet 76 or some other similarly suitable means secures the nose strap 66 to the ring 48. While the separate straps supporting the buckles and the buckles themselves have been described separately from the major strap length for each portion of the halter, these will be referred to collectively hereafter for each portion as the chin straps, the nose straps, the cheek straps, and so forth. These terms will embrace the buckle securing strap, buckle and long strap in each case. A head ring 78 embraces the chin straps where they cross. This latter ring is not essential but is very convenient and does provide a means for securing a lead line such as chain 80 to both chin straps. This double securing of the lead ring provides an added measure of safety since if either chin strap breaks or is loosened, the ring will remain secured to the other one.

By reason of the crossed chin straps and the various buckles my halter is readily adapted to being adjusted to fit on substantially any domesticated animal on which a halter is used. The crossed chin straps when tightened tend to reduce the diameter of the halter and at the same time tend to shorten it. Conversely a lengthening of the chin straps tends to enlarge the diameter of the halter and lengthen it at the same time. By adjusting the cheek straps the shape of the halter from long to short faced animals is achieved and vice versa. The former adjustment is accomplished by tightening the cheek straps and the latter by loosening. Diameter adjustment for the neck and nose are provided without length alteration by the head strap 12 and the nose strap 66. Thus the diameter of the halter may be reduced or enlarged without shortening or lengthening which is necessary for complete adjustment. The advantages of a halter such as mine are numerous. The same halter may be used on a young animal from the beginning and merely adjusted to size as it grows. Furthermore, the animal odors in the halter will be its own, as it will not be wearing a halter discarded by a preceding generation or sibling. It is recognized that just as a human is less apt to be offended by his own body odors, animals are less apt to react violently to tack that has been used only on them. If necessary, however, a colt's halter will fit a full grown stallion, and a calf's its sire. It is not necessary to have as many halters on the premises, therefore, and only one emergency halter is necessary. There is little likelihood of a young growing animal having a poorly fitting halter on either since the one can be adjusted to fit. Consequently my halter reduces the likelihood of injuring or freeing the animal. Also of course no custom built halters for young animals are required. If the breeder has a halter custom made for a show horse as an adult animal, only a size to fit the adult animal is required. My universal halter will serve throughout the growing period. It will be found a very satisfactory halter for adult animals as well but its value is particularly apparent in obviating the need for all the intermediate custom made halters that could otherwise be felt necessary. From the foregoing, it should be clear that I have invented a new halter that is an improvement over the halters generally known before now.

Some changes may be made in the construction and arrangement of my universal halter without departing from the real spirit and purpose of my invention, and it is my intention to cover by my claims, any modified forms of structure or use of mechanical equivalents which may be reasonably included within their scope.

I claim:

1. A halter, comprising, a pair of rings, a pair of squares; one of said rings and one of said squares being arranged in longitudinally spaced relation on each side of said halter, an adjustable chin strap connecting a ring on one side to a square on the other side of said halter, a second chin strap connecting the other of said rings to the other of said squares, an adjustable nose strap connecting said squares, an adjustable head strap connecting said rings, an adjustable cheek strap connecting one of said rings and one of said squares on the same side of said halter, and a second adjustable cheek strap connecting the other of said rings to the other of said squares.

2. A halter, comprising, a pair of rings, a pair of squares; one of said rings and one of said squares being arranged in longitudinally spaced relation on each side of said halter, an adjustable chin strap connecting a ring on one side to a square on the other side of said halter, a second chin strap connecting the other of said rings to the other of said squares; said chin straps crossing each other, a ring embracing said straps at their point of crossing, an adjustable nose strap connecting said squares, an adjustable head strap connecting said rings, an adjustable cheek strap connecting one of said rings and one of said squares on the same side of said halter, and a second adjustable cheek strap connecting the other of said rings to the other of said squares.

3. A halter, comprising, a pair of rings, a pair of squares; one of said rings and one of said squares being arranged in longitudinally spaced relation on each side of said halter, an adjustable chin strap connecting a ring on one side to a square on the other side of said halter, a second chin strap connecting the other of said rings to the other of said squares; a ring embracing at least one of said straps intermediate of its length, an adjustable nose strap connecting said squares, an adjustable head strap connecting said rings, an adjustable cheek strap connecting one of said rings and one of said squares on the same side of said halter, and a second adjustable cheek strap connecting the other of said rings to the other of said squares.

4. A halter comprising, a pair of rings, a pair of squares; one of said rings and one of said squares being arranged in longitudinally spaced relation on each side of said halter, an adjustable chin strap connecting a ring on one side to a square on the other side of said halter, a second chin strap connecting the other of said rings to the other of said squares; said chin straps crossing each other, an adjustable nose strap connecting said squares, an adjustable head strap connecting said rings, an adjustable cheek strap connecting one of said rings and one of said squares on the same side of said halter, and a second adjustable cheek strap connecting the other of said rings to the other of said squares.

5. A halter comprising, a pair of rings, a pair of squares; one of said rings and one of said squares being arranged in longitudinally spaced relation on each side of said halter, an adjustable chin strap connecting a ring on one side to a square on the other side of said halter, a second chin strap also adjustably connecting the other of said rings to the other of said squares, an adjustable nose strap connecting said squares, an adjustable head strap connecting said rings, an adjustable cheek strap connecting one of said rings and one of said squares on the same side of said halter, and a second adjustable cheek strap connecting the other of said rings to the other of said squares.

JOHN O. MUNDELL.

REFERENCES CITED

The following references are of record in the file of this patent:

UNITED STATES PATENTS

| Number | Name | Date |
| --- | --- | --- |
| 1,796,698 | Wenslow | Mar. 17, 1931 |
| 2,304,338 | Crandall | Dec. 8, 1942 |